US010914372B2

(12) United States Patent
Yamamoto et al.

(10) Patent No.: US 10,914,372 B2
(45) Date of Patent: Feb. 9, 2021

(54) SHIFT DEVICE (71) Applicant: KABUSHIKI KAISHA TOKAI RIKA DENKI SEISAKUSHO, Aichi (JP)

(72) Inventors: Makoto Yamamoto, Aichi (JP); Toshiharu Katagiri, Aichi (JP); Shuji Ogata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 406 days.

(21) Appl. No.: 16/071,279

(22) PCT Filed: Jan. 31, 2017

(86) PCT No.: PCT/JP2017/003310
§ 371 (c)(1),
(2) Date: Jul. 19, 2018

(87) PCT Pub. No.: WO2017/135218
PCT Pub. Date: Aug. 10, 2017

(65) Prior Publication Data
US 2020/0166122 A1     May 28, 2020

(30) Foreign Application Priority Data
Feb. 3, 2016   (JP) .................. 2016-019298

(51) Int. Cl.
*F16H 59/08*     (2006.01)
*F16H 61/18*     (2006.01)
(Continued)

(52) U.S. Cl.
CPC ............. *F16H 59/08* (2013.01); *F16H 61/18* (2013.01); *F16H 61/28* (2013.01); *F16H 63/34* (2013.01);
(Continued)

(58) Field of Classification Search
CPC .... F16H 59/08; F16H 2059/081; F16H 61/18; F16H 61/22; F16H 61/24; F16H 61/28;
(Continued)

(56) References Cited

U.S. PATENT DOCUMENTS

| | | |
|---|---|---|
| 9,212,740 B2 | 12/2015 | Watanabe et al. |
| 2015/0152958 A1 | 6/2015 | Watanabe et al. |

(Continued)

FOREIGN PATENT DOCUMENTS

JP   2015-107671   6/2015

OTHER PUBLICATIONS

Official Communication issued in Japan Patent Application No. PCT/JP2017/003310, dated May 9, 2017.

*Primary Examiner* — Richard W Ridley
*Assistant Examiner* — Brian J McGovern
(74) *Attorney, Agent, or Firm* — Greenblum & Bernstein, P.L.C.

(57) ABSTRACT

A shift device includes a knob that is rotatable to select one of a plurality of gear modes of a transmission of a vehicle and a cam member that engages a portion of the knob in a rotation direction of the knob. The cam member rotates integrally with the knob only when engaged with the portion of the knob. The shift device further includes a drive source that rotates the cam member and a controller. The controller controls the drive source to rotate the knob to an operation position corresponding to a predetermined gear mode if a particular condition is satisfied. The controller decreases a voltage applied to the drive source when the cam member is rotated in at least a pre-engagement section until the cam member engages the portion of the knob from the voltage applied when the cam member is rotated in other sections.

6 Claims, 8 Drawing Sheets

(51) Int. Cl.
*F16H 61/28* (2006.01)
*F16H 63/34* (2006.01)
*F16H 63/40* (2006.01)
*G05G 1/08* (2006.01)

(52) U.S. Cl.
CPC ............... *F16H 63/40* (2013.01); *G05G 1/08* (2013.01); *F16H 2059/081* (2013.01)

(58) Field of Classification Search
CPC ......... F16H 2061/223; F16H 2061/243; F16H 63/34; F16H 63/40; G05G 1/10; G05G 1/08
See application file for complete search history.

(56) References Cited

U.S. PATENT DOCUMENTS

| | | | |
|---|---|---|---|
| 2017/0175884 A1* | 6/2017 | Watanabe | F16H 59/08 |
| 2018/0283545 A1* | 10/2018 | Yamada | H02P 25/092 |
| 2018/0363774 A1* | 12/2018 | Yamamoto | G05G 5/18 |
| 2019/0211921 A1* | 7/2019 | Watanabe | F16H 61/22 |
| 2020/0003300 A1* | 1/2020 | Yang | F16H 61/22 |
| 2020/0278023 A1* | 9/2020 | Yamamoto | F16H 61/22 |
| 2020/0326746 A1* | 10/2020 | Koike | G05G 5/26 |

\* cited by examiner

SHIFT DEVICE

TECHNICAL FIELD

The present invention relates to a shift device that shifts gear modes of a transmission by performing a rotation operation.

BACKGROUND ART

In shift devices, a by-wire shift device that shifts gear modes of a transmission by rotating a knob is being developed (refer to, for example, patent document 1).

The shift device described in patent document 1 includes a detent mechanism that holds a knob at an operation position corresponding to a selected gear mode. The vehicle includes a controller that controls the gear mode of the transmission in accordance with the operation position of the knob of the shift device.

Patent Document 1: Japanese Laid-Open Patent Publication No. 2015-107671

SUMMARY OF THE INVENTION

In the by-wire shift device, the driver may stop the engine without shifting the operation position of the knob of the shift device to the parking position. In such a case, the controller performs an automatic return control that shifts the gear mode of the transmission to the parking position regardless of the operation position of the knob of the shift device. This results in the operation position of the knob of the shift differing from the gear mode of the transmission. Thus, the controller changes the knob to the parking position in the automatic return control. When the knob is returned to the parking position in such a manner, the rotation of the knob generates a driving noise in a state in which the engine is stopped. This may be annoying to the driver.

It is an object of the present invention to provide a shift device that is less annoying to the driver when returning the knob to a predetermined operation position.

One aspect of a shift device includes a knob, a cam member, a drive source, and a controller. The knob is rotatable to select one of a plurality of gear modes of a transmission of a vehicle. The cam member engages a portion of the knob in a rotation direction of the knob. The cam member rotates integrally with the knob only when engaged with the portion of the knob. The drive source rotates the cam member. The controller controls the drive source. The controller controls the drive source to rotate the knob to an operation position corresponding to a predetermined gear mode if a particular condition is satisfied. The controller decreases a voltage applied to the drive source when the cam member is rotated in at least a pre-engagement section until the cam member engages the portion of the knob from the voltage applied when the cam member is rotated in other sections.

In the above structure, if particular conditions are satisfied, the controller controls the drive source to rotate the knob to the operation position corresponding to a predetermined gear mode. In this case, during a period in which the cam member is rotated in at least until the cam member engages the portion of the knob, the controller decreases the voltage applied to the drive source from that when the cam member is rotated in other sections. Thus, the speed is reduced until the cam member engages the portion of the knob. This reduces the striking noise generated when the cam member engages the portion of the knob. This will less annoy the driver when the knob returns to a predetermined shift position, for example, the parking position.

In the shift device, it is preferred that during a period in which the cam member is rotated in a pre-post engagement section including the pre-engagement section and a predetermined section after the cam member engages the portion of the knob, the controller gradually increase the voltage applied to the drive source from when the cam member starts rotating and decreases the voltage from that when the cam member is rotated in other sections.

In the above structure, during a period in which the cam member is rotated in the pre-post engagement section including periods before and after the cam member engages the portion of the knob, the voltage applied to the drive source is gradually increased from when the rotation starts. Thus, during a period in which the cam member moves in at least the pre-engagement section, the rotation speed of the cam member is decreased from that when the cam member is rotated in other sections. Further, since the voltage applied to the drive source is gradually increased in the pre-post engagement section, the rotation speed of the cam member when the cam member engages the portion of the knob is lower than a final rotation speed.

In the shift device, it is preferred that the controller determine that the cam member has engaged the portion of the knob based on a predetermined time from when the rotation starts.

In the above structure, the controller determines that the cam member has engaged the portion of the knob based on the predetermined time from when the rotation starts. This allows the controller to determine that the cam member has engaged the portion of the knob without a detector that detects rotation of the cam member.

In the shift device, it is preferred that the controller determine that the cam member has engaged the portion of the knob from when a current value of the drive source becomes greater than or equal to a predetermined value.

In the above structure, the controller determines that the cam member has engaged the portion of the knob when the current value of the drive source becomes greater than or equal to the predetermined value. This allows the controller to determine that the cam member has engaged the portion of the knob from the actual engagement result without a detector that detects rotation of the cam member.

In the shift device, it is preferred that the knob include a detent that holds the knob at an operation position corresponding to a gear mode selected from the plurality of gear modes and a detent pin abut against the detent by a biasing force of a spring. In this case, it is preferred that the detent include a detent surface including a plurality of ridges and a plurality of valleys. One of the ridges is alternately continuous with one of the valleys. Further, it is preferred that the detent be configured to hold the knob at the operation position corresponding to the selected gear mode by fitting the detent pin to one of the valleys and to produce click when the knob is rotated as the detent pin moves over the ridges.

In the above structure, when the knob is rotated, click is produced by the detent surface on the detent of the knob and the detent pins biased by the springs.

In the shift device, it is preferred that after the cam member is rotated in the pre-engagement section and during a period in which the detent pin is moving from a peak of each of the ridges to a bottom of an adjacent one of the valleys on the detent surface, the controller decrease voltage applied to the drive source from that when the detent pin moves from the bottom of each of the valleys to the peak of an adjacent one of the ridges on the detent surface. Further, in this case, it is preferred that the controller determine a period in which the detent pin moves from the peak of each of the ridges to the bottom of an adjacent one of the valleys on the detent surface based on a predetermined time from when the rotation starts.

The above structure decreases the speed of the detent pins moving from the peak of each ridge on the detent surface toward the adjacent valley. Thus, the striking noise generated when the detent pins strike the vicinity of the bottoms of the valleys in the detent surface is reduced. Further, the controller determines the period until the detent pins move from the vicinity of the peaks of the ridges on the detent surface to the bottoms of the valleys based on the predetermined time from when the rotation starts. This allows the controller to determine the positions of the detent pins relative to the detent surface without a detector that detects rotation of the cam member.

The present invention less annoys the driver when returning the knob to a predetermined operation position.

DESCRIPTION OF THE EMBODIMENTS

One embodiment of a shift device will now be described with reference to FIGS. 1 to 12.

Mechanical Structure

Figure 1:
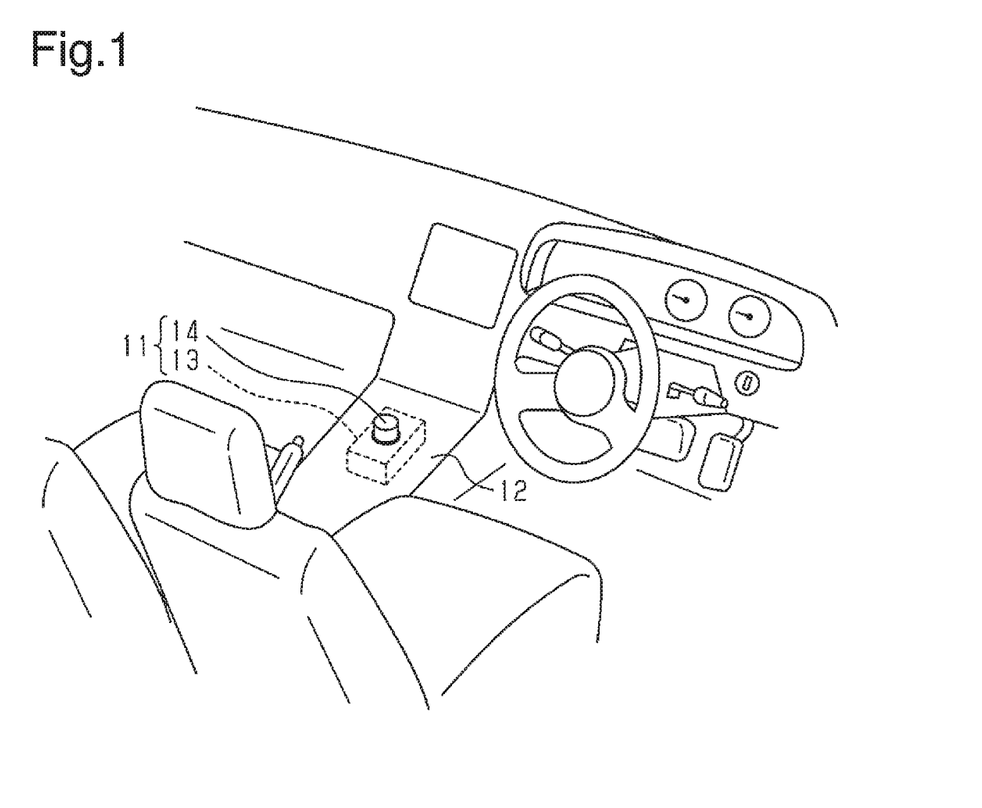
FIG. 1 is a perspective view illustrating the passenger compartment of a vehicle in which one embodiment of a shift device is installed.

As illustrated in FIG. 1, a shift device 11 is provided on a center console 12 of a vehicle. The shift device 11 includes a case 13 and a cylindrical dial knob 14 arranged to be rotatable relative to the case 13. The case 13 is arranged in the center console 12. The dial knob 14 is exposed to the outside of the center console 12. The dial knob 14 is rotated to shift gear modes of a transmission (not illustrated).

Figure 2:
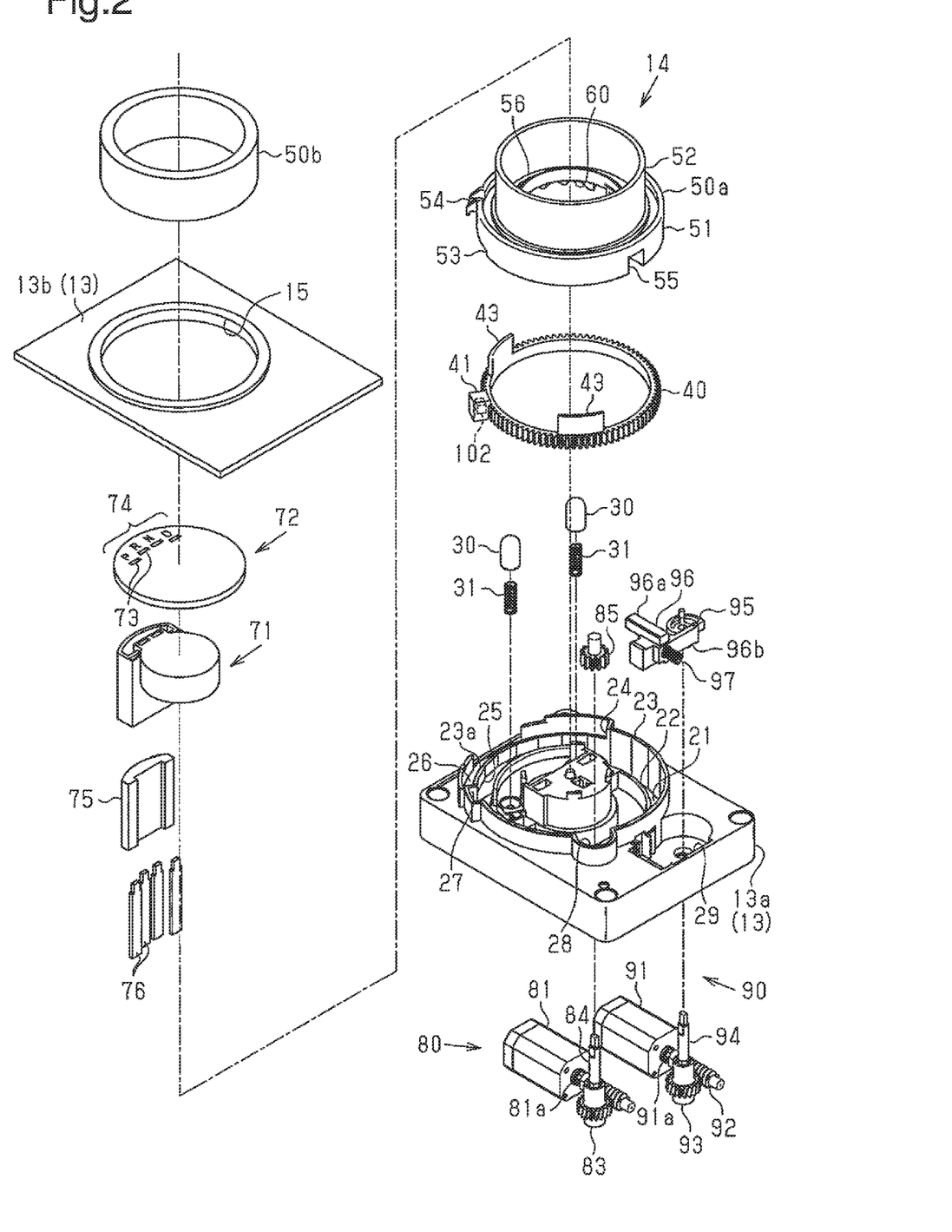
FIG. 2 is an exploded perspective view illustrating the structure of the shift device of FIG. 1.

As illustrated in FIG. 2, the case 13 includes a box-shaped case body 13a and a cover 13b that covers the upper part of the case body 13a. The cover 13b includes a hole 15 through which a dial knob 14 extends. The dial knob 14 includes a tubular knob body 50a and a tubular knob cover 50b attached to an upper circumferential surface of the knob body 50a.

An annular groove 21 is formed in the upper part of the case body 13a. The annular groove 21 rotationally accommodates a rotor cam 40, which is an annular cam member, and part of the knob body 50a, which is located on the rotor cam 40. The formation of the annular groove 21 forms an inner circumferential wall 22 and an outer circumferential wall 23. A cutout 24 extends over a rotation range (approximately 120°) of the dial knob 14 in the upper part of the outer circumferential wall 23 at the front side of the shift device. A portion of the outer circumferential wall 23 including the cutout 24 is defined as a guide portion 23a. The guide portion 23a functions as a guide that guides the knob body 50a. Further, a through hole 25 extends over the rotation range (approximately 120°) of the dial knob 14 in the lower part of the outer circumferential wall 23 where the cutout 24 is located. In addition, an arcuate groove 26 is formed outside the guide portion 23a along the annular groove 21 in an arcuate manner. The arcuate groove 26 includes a position detection magnet (not illustrated). A coupling guide hole 27 is formed at the left side of the cutout 24 of the outer circumferential wall 23.

The rotor cam 40 is slidable and rotatable relative to the case body 13a in the annular groove 21. The rotor cam 40 is a gear having successive teeth on its outer circumference. Part of the outer circumference of the rotor cam 40 includes a box-shaped engagement portion 41 that engages the knob body 50a. The engagement portion 41 includes a cam position sensor 102 that detects a rotation position of the rotor cam 40. The cam position sensor 102 corresponds to a detector. The rotor cam 40 is arranged in the annular groove 21 passing through the coupling guide hole 27 and positioned relative to the annular groove 21. Two guide portions 43 are provided on the upper part of the rotor cam 40. The guide portions 43 extend along an inner wall of the knob body 50a. The guide portions 43 guide the rotation of the rotor cam 40. Further, the guide portions 43 abut against projections arranged inside the knob body 50a to restrict the rotation range of the rotor cam 40.

The lower portion of the knob body 50a in an axial direction defines an annular large-diameter portion 51. The large-diameter portion 51 includes a cutout 53. The cutout 53 extends over a range including the arcuate groove 26 and the guide hole 27 of the case body 13a. A holding portion 54 that holds the guide portion 23a is arranged outside the large-diameter portion 51. The holding portion 54 is slidable and holds the guide portion 23a to guide the rotation of the knob body 50a. Further, the knob body 50a includes a lock hole 55 at the opposite side of the holding portion 54. A lock member 96 is inserted into the lock hole 55 to restrict rotation of the knob body 50a. A shift position sensor that detects an operation position of the dial knob 14 is arranged on a lower surface of the knob body 50a.

The upper portion of the knob body 50a in the axial direction defines an annular small-diameter portion 52 that is continuous with the large-diameter portion 51. A circular detent 56 that holds the dial knob 14 in place is arranged on a lower inner wall of the small-diameter portion 52. The lower surface of the detent 56 defines a detent surface 60 (refer to FIG. 4).

The knob cover 50b is fixed covering the circumferential surface of the small-diameter portion 52 of the knob body 50a. The knob cover 50b is inserted into the hole 15 of the cover 13b from below and kept exposed to the outside.

Two detent pins 30 are arranged on the upper part of the case body 13a with springs 31 located in between. The detent pins 30 are abut against the detent surface 60 of the knob body 50a by the biasing forces of the springs 31 (refer to FIG. 4). The detent 56, the detent pins 30, and the like function as a detent mechanism.

A holder 71 is fixed to the upper part of the case body 13a. The holder 71 is arranged so as to be inserted into the inside of the knob body 50a. A circular cover panel 72 is attached to the upper part of the holder 71. The cover panel 72 closes the opening of the knob body 50a or the knob cover 50b from the inner side. Further, the cover panel 72 is rotatable relative to the knob body 50a and the knob cover 50b. The cover panel 72 includes a plurality of through holes 73. The through holes 73 are equal in number (four in this specification) to the gear modes of the transmission. The through holes 73 are arranged along the outer circumference in line at a portion separated from the center of the cover panel 72. Further, a plurality of marks 74 indicate the types of the gear modes on an upper surface (surface) of the cover panel 72. Here, "P" representing a parking mode, "R" representing a reverse mode, "N" representing a neutral mode, and "D" representing a drive mode are arranged in line along the outer circumference in correspondence with the through holes 73. Each mark 74 is formed from a translucent material.

Further, a mark illumination light guide 75 and a plurality of mode notification light guides 76 are held in the holder 71. The light guide 75 is box-shaped. The width of the light guide 75 is about the same as that of a formation range of each mark 74 on the cover panel 72. The light guide 75 is located immediately below the formation range of the marks 74 of the cover panel 72. The light guide 75 releases, out of a back surface of each mark 74, light from a light source (not illustrated) located immediately below the light guide 75. That is, each mark 74 is illuminated from the back surface. In addition, each light guide 76 has the form of a rectangular thin plate. A distal end of each light guide 76 is fitted into the corresponding through hole 73 from below the cover panel 72 and exposed to the outside. Each light guide 76 guides light from the corresponding light source (not illustrated), which is located immediately below the light guide 76, to the upper part of the holder 71 and releases the light to the outside. Only the light source of the light guide 76 corresponding to the presently selected gear mode is turned on.

Figure 3:
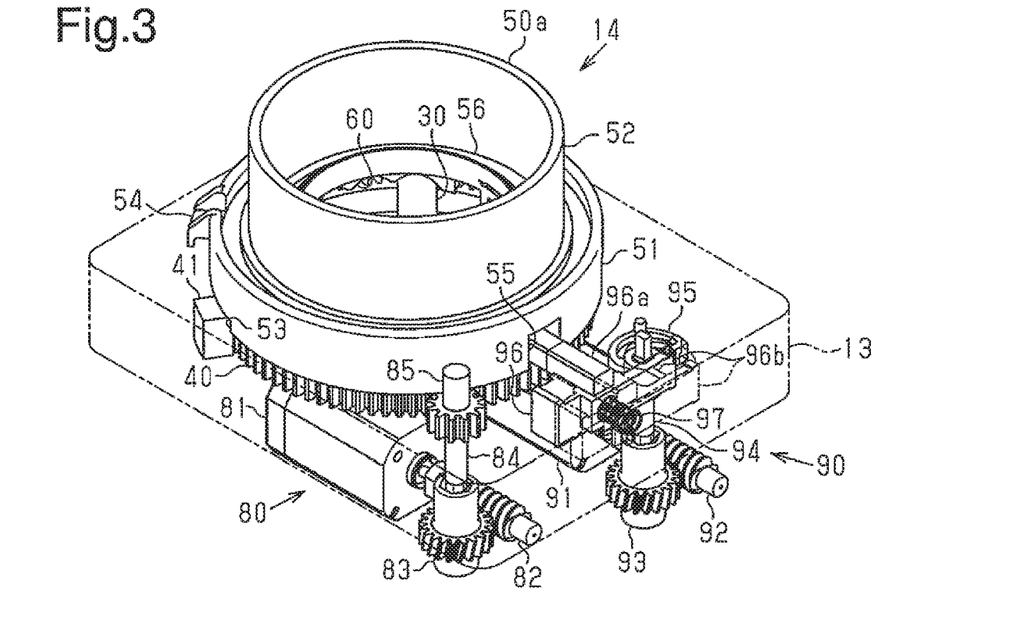
FIG. 3 is an upper perspective view illustrating the shift device of FIG. 2.
Figure 4:
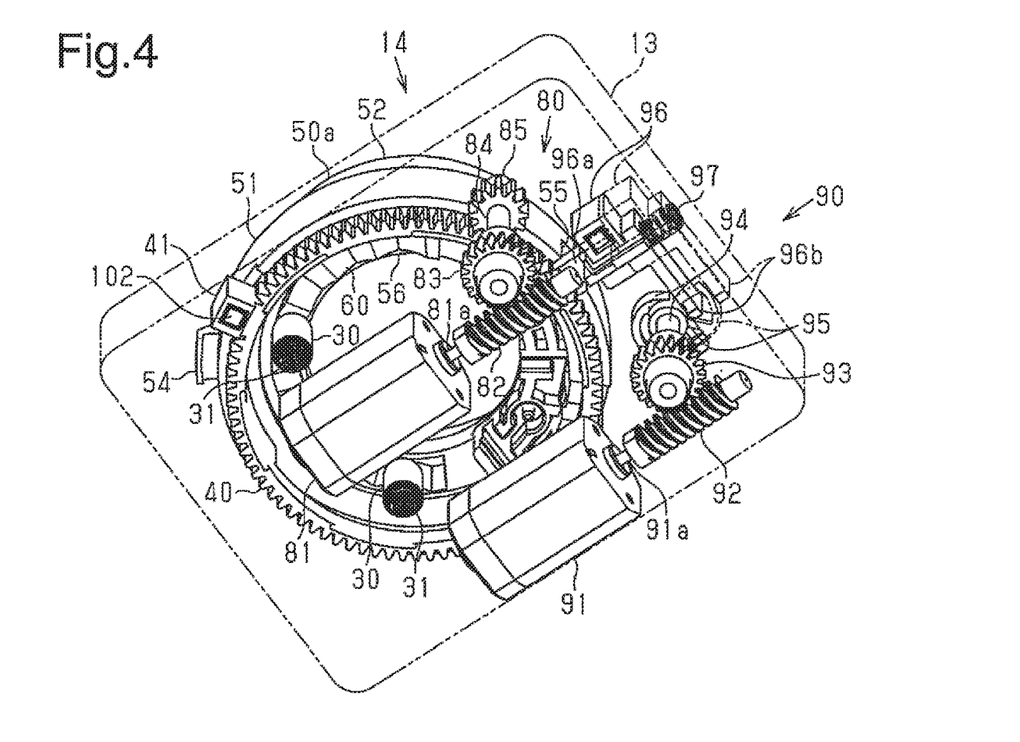
FIG. 4 is a lower perspective view illustrating the shift device of FIG. 2.

As illustrated in FIGS. 3 and 4, the case 13 includes a drive mechanism 80. The drive mechanism 80 is a mechanism that rotates the dial knob 14 and is actuated when, for example, a traveling drive source of the vehicle is stopped in a state in which the dial knob 14 has been rotated to a drive position. The drive mechanism 80 includes a first motor 81 serving as a drive source, a worm 82, a worm wheel 83, a connecting shaft 84, and a gear 85. The first motor 81 is arranged in the case body 13a. The first motor 81 includes a drive shaft 81a extending in a front-to-rear direction of the shift device. The worm 82 is coaxially coupled to the drive shaft 81a. The worm 82 meshes with the worm wheel 83 that extends orthogonal to the drive shaft 81a in a vertical direction of the shift device. The worm 82 and the worm wheel 83 form a worm gear. The connecting shaft 84 is fixed to the worm wheel 83. The upper part of the case body 13a includes a gear accommodation portion 28 (refer to FIG. 2) accommodating the gear 85, which rotates the rotor cam 40. The connecting shaft 84 extends from the inside of the case body 13a into the gear accommodation portion 28 of the case body 13a. The gear 85 is fixed to the end of the connecting shaft 84 that is not connected to the worm wheel 83. The gear 85 meshes with the rotor cam 40. Thus, the rotation generated by the first motor 81 is transmitted to the rotor cam 40 through the worm 82, the worm wheel 83, the connecting shaft 84, and the gear 85. FIGS. 3 and 4 illustrate a state in which the dial knob 14 has been rotated to the parking position.

As illustrated in FIGS. 3 and 4, the case 13 includes a shift lock mechanism 90 that restricts rotation of the dial knob 14. The shift lock mechanism 90 is actuated when the traveling drive source of the vehicle is stopped in a state in which the dial knob 14 is located at the parking position that is the operation position corresponding to the parking mode "P." The shift lock mechanism 90 includes a second motor 91, a worm 92, a worm wheel 93, a connecting shaft 94, a cam member 95, and a lock member 96. The second motor 91 is arranged in the case body 13a. The second motor 91 includes a drive shaft 91a extending in the front-to-rear direction of the shift device. The worm 92 is coaxially coupled to the drive shaft 91a. The worm 92 meshes with the worm wheel 93 that extends orthogonal to the drive shaft 91a in the vertical direction of the shift device. The worm 92 and the worm wheel 93 form a worm gear. The connecting shaft 94 is fixed to the worm wheel 93. The upper part of the case body 13a includes a lock accommodation portion 29 (refer to FIG. 2) accommodating the lock member 96 and the cam member 95 that transmits drive force to the lock member 96. The connecting shaft 94 extends from the inside of the case body 13a into the lock accommodation portion 29 of the case body 13a. The cam member 95 is fixed to the end of the connecting shaft 94 that is not connected to the worm wheel 93. Thus, the rotation generated by the second motor 91 is transmitted to the cam member 95 through the worm 92, the worm wheel 93, and the connecting shaft 94. The cam member 95 abuts against the lock member 96. Rotation of the cam member 95 moves the lock member 96 straight. The lock member 96 includes a box-shaped lock portion 96a extending into the lock hole 55 of the knob body 50a and a plate-shaped abutment portion 96b that abuts against the cam member 95. The lock member 96 is constantly biased toward the knob body 50a by a spring 97 arranged between the lock member 96 and the lock accommodation portion 29. That is, the lock member 96 is moved to an unlock position when a large-diameter portion of the cam member 95 abuts against the lock member 96, and the lock member 96 is biased by the spring 97 and moved to a lock position when a small-diameter portion of the cam member 95 abuts against the lock member 96. FIGS. 3 and 4 illustrate a state in which the shift lock mechanism 90 restricts rotation of the dial knob 14.

Figure 5:
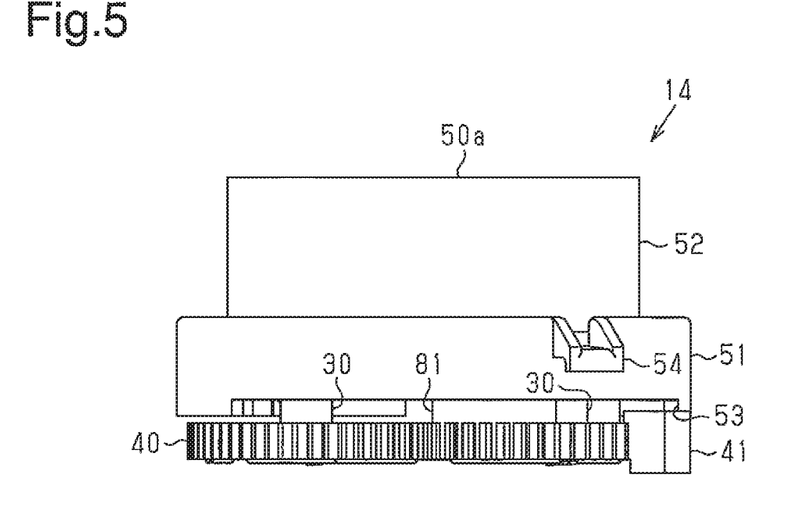
FIG. 5 is a front view illustrating the positional relationship of a dial knob and a rotor cam of the shift device of FIG. 2.

As illustrated in FIG. 5, when the dial knob 14 is located at the parking position and the vehicle power is off, the engagement portion 41 of the rotor cam 40 is located in the vicinity of the left end of the cutout 53 in the knob body 50a. Since the engagement portion 41 of the rotor cam 40 is located in the vicinity of the left end of the cutout 53 in the knob body 50a, the dial knob 14 cannot be rotated from the parking position to the drive position or the like, that is, in the counterclockwise direction.

Figure 6:
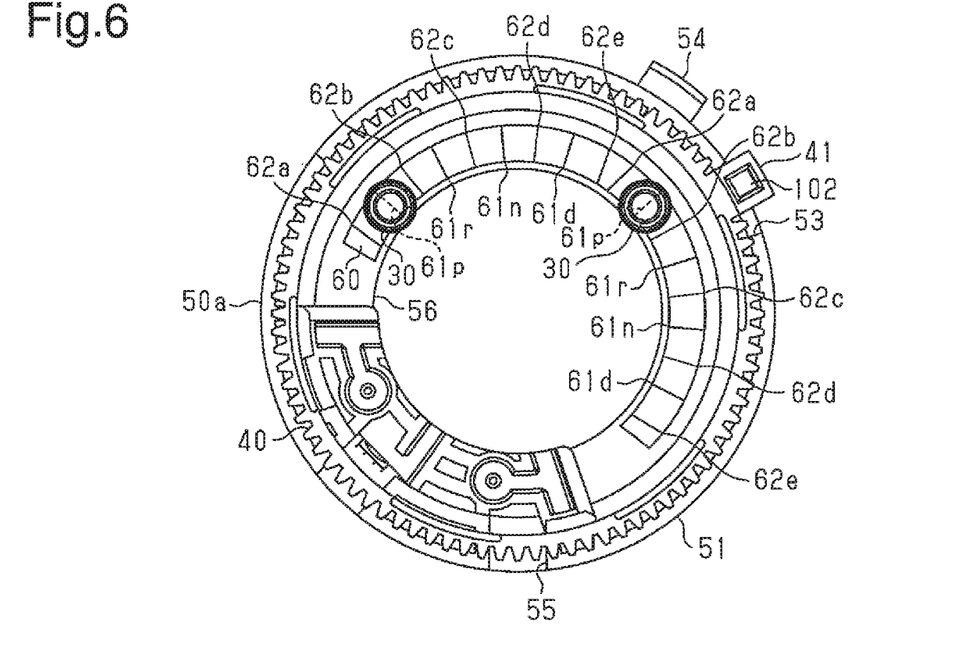
FIG. 6 is a bottom view illustrating the positional relationship of the dial knob, the rotor cam, and detent pins of the shift device of FIG. 2.

As illustrated in FIG. 6, the detent surface 60 of the detent 56 of the knob body 50a includes a plurality of ridges 62 and a plurality of valleys 61. One of the ridges 62 is alternately continuous with one of the valleys 61. In the present example, the two detent pins 30 are each provided with a single set of the ridges 62 and the valleys 61 on the detent surface 60. Four valleys 61 (61p, 61r, 61n, and 61d) are provided on the detent surface 60 for each detent pin 30 in the rotation direction of the knob body 50a. The ridges 62 (62a, 62b, 62c, 62d, and 62e) are arranged at positions adjacent to the valleys 61p, 61r, 61n, and 61d. The valleys 61 and the ridges 62 are smoothly continuous in the rotation direction of the knob body 50a. The valleys 61p, 61r, 61n, and 61d correspond to the operation positions of the dial knob 14 when operated to shift to the transmission gear modes of "P," "R," "N," and "D."

The detent pins 30 are constantly biased and pushed toward the detent surface 60 by the biasing force of the spring 31. When the knob body 50a is rotated, the distal ends of the detent pins 30 slide and elastically contact the detent surface 60 and sequentially engage the valleys 61p, 61r, 61n, and 61d. Thus, the dial knob 14 obtains an operation feel such as a suitable clicking feel.

When the detent pins 30 are engaged with each of the valleys 61p, 61r, 61n, and 61d, the operation positions of the knob body 50a respectively correspond to the gear modes "P," "R," "N," and "D." The dial knob 14 is operated to rotate the knob body 50a to the operation position corresponding to each of the gear modes "P," "R," "N," and "D." This shifts the gear modes of the transmission.

Figure 9:
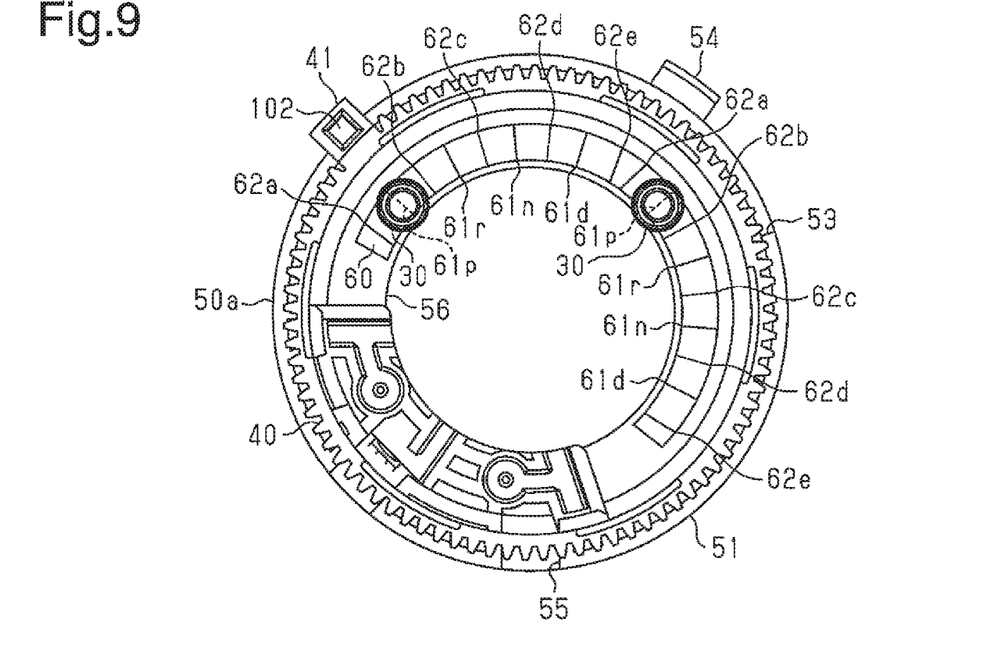
FIG. 9 is a bottom view illustrating the positional relationship of the dial knob, the rotor cam, and the detent pins of the shift device of FIG. 2.

Normally, the rotor cam 40 is positioned so as not to restrict rotation of the knob body 50a (refer to FIG. 9). Further, the engagement portion 41 is engaged with the left end of the cutout 53 in the knob body 50a by the driving force of the first motor 81 and rotated together with the dial knob 14 only when the dial knob 14 is rotated to the parking position (refer to FIGS. 11 and 12).

Electrical Configuration

The electrical configuration of the shift device 11 will now be described with reference to FIG. 7.

Figure 7:
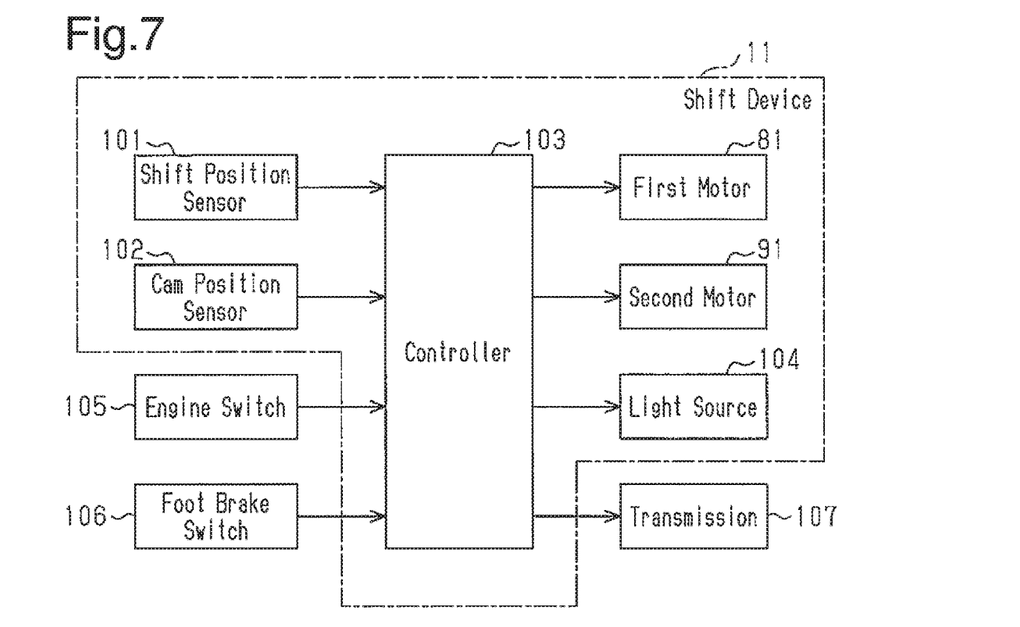
FIG. 7 is a block diagram illustrating the electrical configuration of the shift device of FIG. 1.

As illustrated in FIG. 7, the shift device 11 includes a shift position sensor 101, the cam position sensor 102, and a controller 103. The shift position sensor 101 and the cam position sensor 102 are connected to the controller 103. Further, the first motor 81, the second motor 91, and a light source 104 are connected to the controller 103. Additionally, an engine switch 105, a foot brake switch 106, and a transmission 107, which are arranged in the vehicle, are connected to the controller 103.

The shift position sensor 101 generates an electric signal corresponding to the operation position of the knob body 50a. The cam position sensor 102 generates an electric signal corresponding to the rotation position of the rotor cam 40. The light source 104 supplies light to each of the light guide 75 and the light guides 76. The light source 104 may include a plurality of light-emitting diodes corresponding to each of the light guides 75 and 76. The engine switch 105 detects operations for stopping or starting the engine (not illustrated), which is a traveling drive source of the vehicle. The foot brake switch 106 detects depression of the brake pedal (not illustrated).

The controller 103 detects the operation positions of the dial knob 14, specifically, the operation positions "P," "R," "N," and "D" of the knob body 50a, from the electric signal generated by the shift position sensor 101. The controller 103 generates an instruction signal for shifting the gear mode of the transmission 107 in accordance with the operation position of the knob body 50a. In addition, the controller 103 controls and drives the first motor 81 and the second motor 91 in accordance with the operation position of the knob body 50a and the activation or deactivation state of the engine switch 105 and the foot brake switch 106.

When detecting predetermined particular actions indicating that the gear mode of the transmission 107 is to be shifted to the parking mode, the controller 103 generates an instruction signal for automatically shifting the gear mode of the transmission 107 to the parking mode regardless of the operation position of the dial knob 14. The particular actions may include, for example, the stopping of the engine that serves as the traveling drive force of the vehicle, the removal of a mechanical key from a key cylinder, or the opening of the door. These particular actions are detected by various sensors including the engine switch 105.

Further, when detecting the particular actions from the various sensors, the controller 103 executes control in accordance with the present state of the dial knob 14. That is, an electric signal generated from a sensor that detects a particular action functions as a trigger signal that initiates the control executed in accordance with the state of the dial knob 14. The trigger signal is, for example, an electric signal indicating that the engine switch 105 has been turned off, an electric signal indicating that the mechanical key has been removed from the key cylinder, or an electric signal indicating that the door has been opened.

For example, when particular conditions are satisfied including the detection of a particular action and the dial knob 14 being maintained at an operation position corresponding to a gear mode other than the parking mode "P," namely, the gear mode of "R," "N," or "D," the controller 103 executes an automatic return action with the dial knob 14. That is, the dial knob 14 is automatically shifted to the parking position, which is the operation position corresponding to the parking mode "P."

Automatic Return Action

The process of the automatic return action executed by the controller 103 will now be described with reference to FIGS. 8 to 12.

If the particular conditions are satisfied, the controller 103 controls the first motor 81 to rotate the dial knob 14 to the operation position corresponding to the parking mode "P." In this case, when rotation starts, the controller 103 decreases the rotation speed in at least a pre-engagement section, in which the rotor cam 40 is rotated until the engagement portion 41 of the rotor cam 40 engages the left end of the cutout 53 in the dial knob 14, from the rotation speed of the rotor cam 40 for other sections. In the pre-engagement section, the first motor 81 is driven to rotate only the rotor cam 40. In a post-engagement section, the rotor cam 40, which is rotated when the first motor 81 is driven, presses the knob body 50a so that the rotor cam 40 rotates together with the knob body 50a. The controller 103 determines the rotor cam 40 has engaged the dial knob 14 based on a predetermined time t from when the rotation starts.

Figure 8:
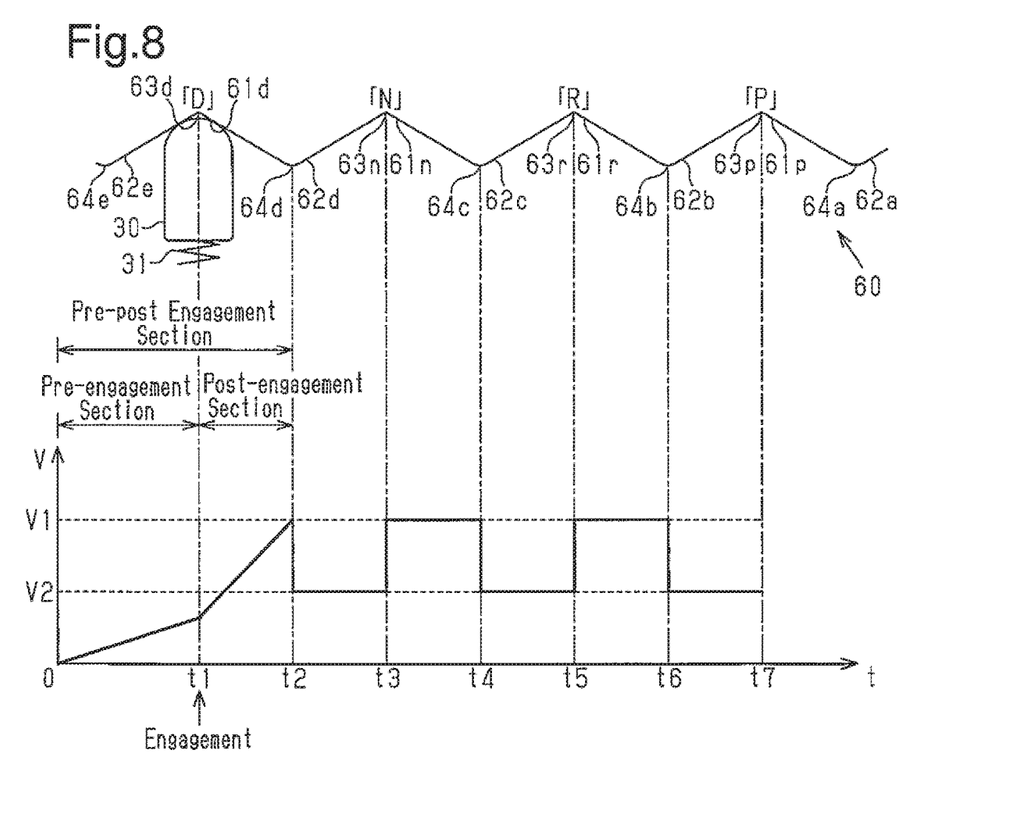
FIG. 8 is a graph illustrating control performed on a drive source by the shift device of FIG. 2.

More specifically, as illustrated in FIG. 8, the controller 103 drives the first motor 81 to rotate the rotor cam 40 so that the rotor cam 40 engages the left end of the cutout 53 in the knob body 50a at time t1. As the rotor cam 40 is rotated in a pre-post engagement section (time 0 to time t2) that includes the pre-engagement section (time 0 to time t1) and a predetermined section (post-engagement section, time t1 to time t2) after the engagement portion 41 of the rotor cam 40 engages the left end of the cutout 53 in the knob body 50a, the controller 103 gradually increases a drive voltage V of the first motor 81 from when the rotation starts (time 0) instead of keeping the drive voltage V constant. The drive voltage V of the first motor 81 in the pre-engagement section (time 0 to time t1) is lower than that when the rotor cam 40 is rotated in other sections. The drive voltage V of the first motor 81 in the post-engagement section (time t1 to time t2) becomes greater than or equal to the drive voltage V at time t1 and gradually rises to a normal first voltage V1.

The controlling of the rotation speed of the rotor cam 40 in such a manner reduces the striking noise generated when the rotor cam 40 engages and strikes the dial knob 14. This will less annoy the driver when the dial knob 14 returns to, for example, the parking position.

Further, during a period in which the detent pin 30 moves from the vicinity of a peak 64 (64a, 64b, 64c, 64d, or 64e) of a ridge 62 on the detent surface 60 to a bottom 63 (63p, 63r, 63n, or 63d) of an adjacent valley 61, the controller 103 decreases the rotation speed of the dial knob 14 from that when the detent pin 30 moves on the other portions in the detent surface 60. The parking mode "P" corresponds to a predetermined gear mode that is automatically returned.

For example, as illustrated in FIG. 8, as the detent pin 30 moves from the vicinity of the peak 64 of each ridge 62 on the detent surface 60 to the bottom 63 of the adjacent valley 61 (time t2 to time t3, time t4 to time t5, and time t6 to time t7), the controller 103 drives the first motor 81 with a second voltage V2 that is lower than the normal first voltage V1 instead of keeping the drive voltage constant. It is desirable that the second voltage V2 be lower than, for example, fifty percent of the first voltage V1. Then, the controller 103 drives the first motor 81 with the first voltage V1 until the detent pin 30 reaches the peak 64 of a ridge 62 on the detent surface 60. Further, the controller 103 drives the first motor 81 with the second voltage V2, which is lower than the normal first voltage V1, as the detent pin 30 moves from the peak 64 of the ridge 62 to the bottom 63 of a valley 61.

The controlling of the rotation speed of the knob body 50a with regard to the detent pin 30 in such a manner reduces the speed as the detent pin 30 moves toward a valley 61 in the detent surface 60 and reduces the striking noise generated when the detent pin 30 strikes the vicinity of the bottom 63 of the valley 61 in the detent surface 60. This will less annoy the driver when the dial knob 14 returns to, for example, the parking position.

First, as illustrated in FIG. 9, in the shift device 11, when the vehicle engine is started and the foot brake is depressed, the dial knob 14 becomes operable in a state located at the operation position corresponding to the parking mode "P." The detent pins 30 are fitted in the valleys 61p in the detent surface 60 that correspond to the parking mode "P." In this case, the rotor cam 40 is moved to a position that does not restrict rotation of the knob body 50a. Further, the lock member 96 of the shift lock mechanism 90 is located at the unlock position. The engagement portion 41 of the rotor cam 40 is located at substantially the circumferentially middle part in the cutout 53 in the knob body 50a. Thus, the dial knob 14 is rotatable. In this state, when the driver rotates the dial knob 14, the gear modes can be shifted as the detent pins 30 and the detent surface 60 of the detent 56 produce a clicking feel.

Figure 10:
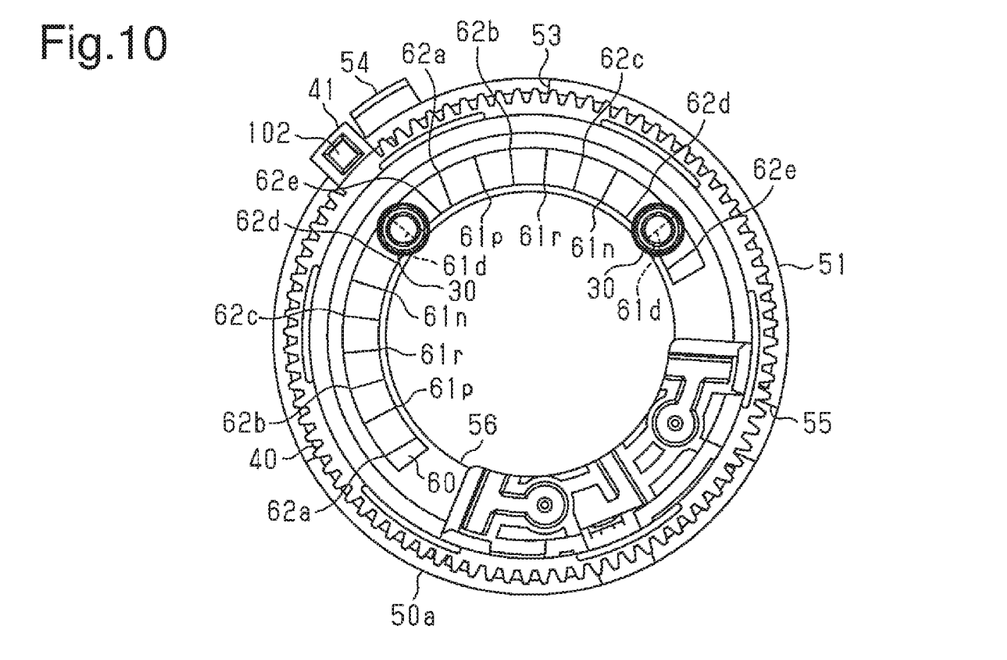
FIG. 10 is a bottom view illustrating the positional relationship of the dial knob, the rotor cam, and the detent pins of the shift device of FIG. 2.

Next, as illustrated in FIG. 10, in the shift device 11, the driver rotates the dial knob 14 to the operation position corresponding to the drive mode "D" to drive the vehicle. The knob body 50a is rotated from the operation position corresponding to the parking mode "P" to the operation position corresponding to the drive mode "D" as the detent pins 30 slide in contact with the detent surface 60. The detent pins 30 fit into the valleys 61d in the detent surface 60 corresponding to the drive mode "D." The rotor cam 40 is not moved from the position that does not restrict rotation of the knob body 50a.

Figure 11:
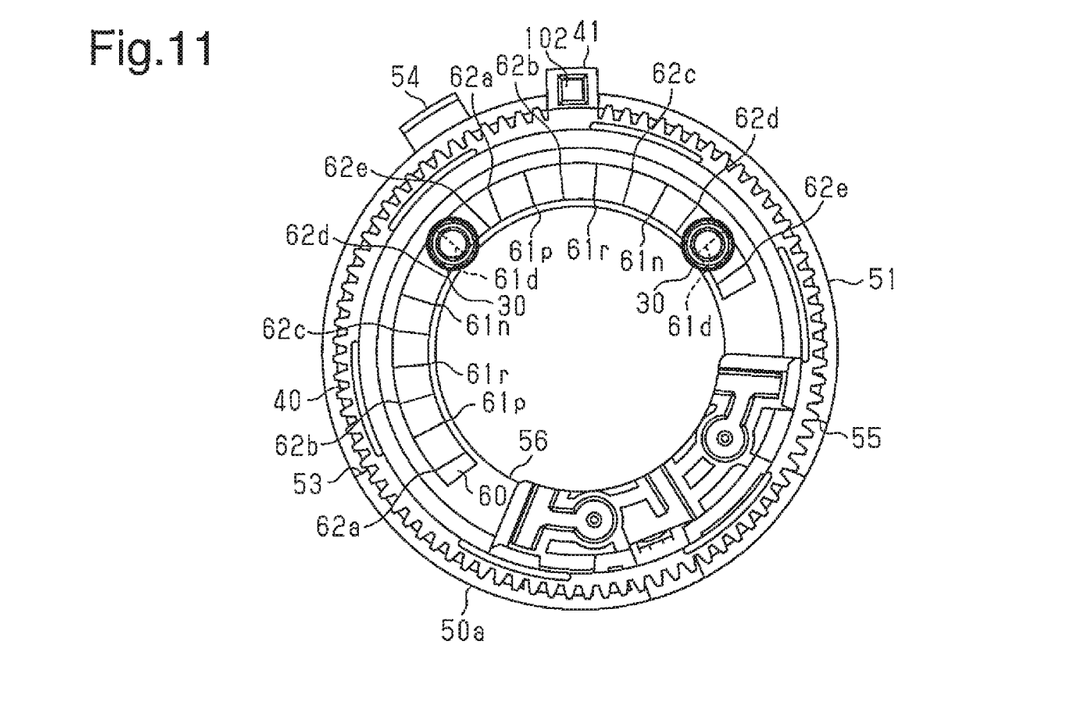
FIG. 11 is a bottom view illustrating the positional relationship of the dial knob, the rotor cam, and the detent pins of the shift device of FIG. 2.

Then, as illustrated in FIG. 11, if the driver, for example, stops the engine without rotating the dial knob 14 from the operation position corresponding to the drive mode "D" to the operation position corresponding to the parking mode "P," the shift device 11 rotates the rotor cam 40 to the position where the engagement portion 41 abuts against the left end of the cutout 53 in the knob body 50a. That is, the controller 103 drives the first motor 81 to rotate the rotor cam 40 in the counterclockwise direction. In this case, the controller 103 decreases the rotation speed of the rotor cam 40 in the pre-engagement section (time 0 to time t1) until the engagement portion 41 of the rotor cam 40 abuts against the left end of the cutout 53 in the knob body 50a as compared with other sections in which the rotor cam 40 is rotated. The controlling of the rotation speed of the rotor cam 40 in such a manner reduces the striking noise generated when the rotor cam 40 strikes the knob body 50a. This will less annoy the driver when the dial knob 14 is returned to, for example, the parking position "P."

Figure 12:
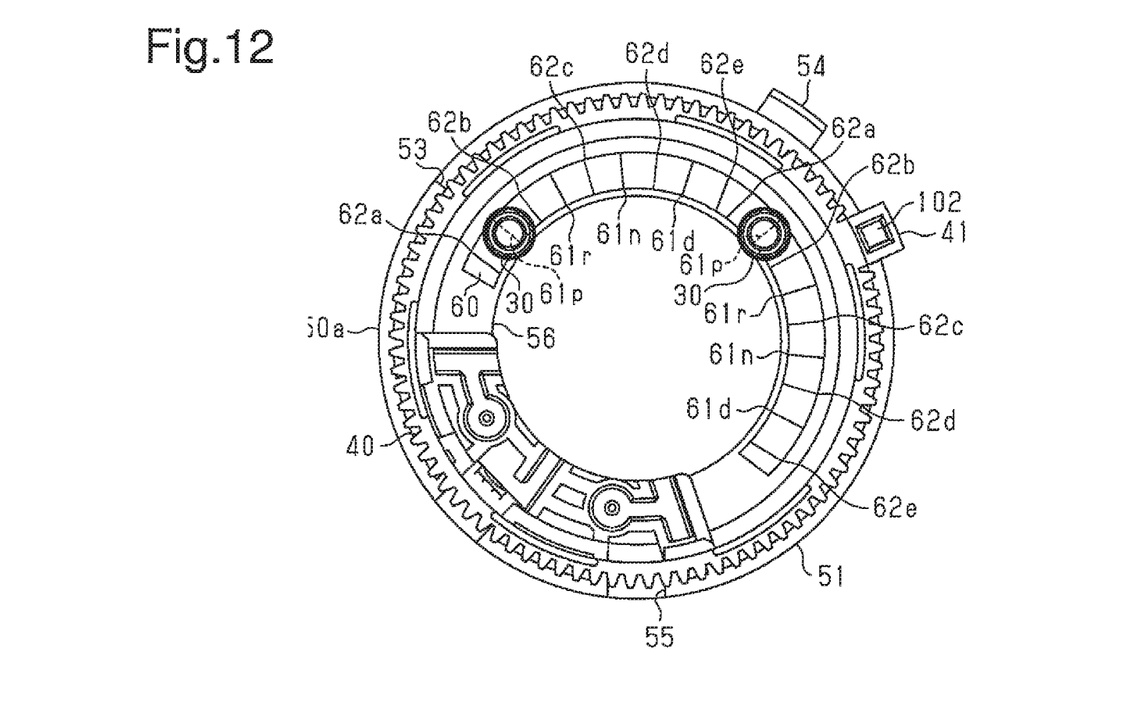
FIG. 12 is a bottom view illustrating the positional relationship of the dial knob, the rotor cam, and the detent pins of the shift device of FIG. 2.

Subsequently, as illustrated in FIG. 12, the shift device 11 rotates the rotor cam 40 in the counterclockwise direction to rotate the knob body 50a to the operation position corresponding to the parking mode "P." This rotates the knob body 50a from the operation position corresponding to the drive mode "D" to the operation position corresponding to the parking mode "P." In this case, the knob body 50a is pressed by the rotor cam 40 and rotated from the operation position corresponding to the drive mode "D" to the operation position corresponding to the parking mode "P" as the detent pins 30 slide in contact with the detent surface 60. Further, as described above, to rotate the rotor cam 40, as the detent pins 30 move from the vicinity of the peak 64 of a ridge 62 on the detent surface 60 to the bottom 63 of a valley 61, the controller 103 decreases the rotation speed of the dial knob 14 from that when the detent pins 30 move on other portions in the detent surface 60. The controlling of the rotation speed of the knob body 50a relative to the detent pin 30 in such a manner reduces the striking noise generated when the detent pin 30 strikes the detent surface 60. This will less annoy the driver when the dial knob 14 is returned to, for example, the parking position "P."

Afterwards, as illustrated in FIG. 6, the controller 103 slightly rotates the rotor cam 40 in the clockwise direction and releases the engagement portion 41 from the state abut against the left end of the cutout 53 in the knob body 50a.

As described above, the present embodiment has the advantages described below.

(1) If particular conditions are satisfied, the first motor 81 is controlled to rotate the dial knob 14 to the operation position corresponding to a predetermined gear mode. In this case, during a period in which the rotor cam 40 is rotated in at least the pre-engagement section until the engagement portion 41 of the rotor cam 40 engages the cutout 53 in the dial knob 14, the rotation speed of the rotor cam 40 is decreased from that when the rotor cam 40 is rotated in other sections. Thus, the speed is reduced until the engagement portion 41 of the rotor cam 40 engages the cutout 53 in the dial knob 14. This reduces the striking noise generated when the engagement portion 41 of the rotor cam 40 engages the cutout 53 in the dial knob 14. This will less annoy the driver when the dial knob 14 returns to the parking position.

(2) During a period in which the rotor cam 40 is rotated in the pre-post engagement section including periods before and after the engagement portion 41 of the rotor cam 40 engages the cutout 53 in the dial knob 14, the rotation speed of the rotor cam 40 is gradually increased from when the rotation starts. Thus, during a period in which the rotor cam 40 moves in at least the pre-engagement section, the rotation speed of the rotor cam 40 is decreased from that when the rotor cam 40 is rotated in other sections. Further, since the rotation speed of the rotor cam 40 is gradually increased in the pre-post engagement section, the rotation speed of the rotor cam 40 when the engagement portion 41 of the rotor cam 40 engages the cutout 53 in the dial knob 14 is lower than a final rotation speed at time t2.

(3) The controller 103 determines that the engagement portion 41 of the rotor cam 40 has engaged the cutout 53 in the dial knob 14 based on the predetermined time from when the rotation starts. This allows the controller 103 to determine that the engagement portion 41 of the rotor cam 40 has engaged the cutout 53 in the dial knob 14 without a detector that detects rotation of the rotor cam 40.

(4) When the dial knob 14 is rotated, click is produced by the detent surface 60 on the detent 56 of the dial knob 14 and the detent pins 30 biased by the springs 31.

(5) If particular conditions are satisfied, the first motor 81 is controlled to rotate the dial knob 14 to the operation position corresponding to a predetermined mode. After the rotor cam 40 is moved to the pre-engagement section, as the detent pins 30 move from the vicinity of the peaks 64 of ridges 62 on the detent surface 60 to the bottoms 63 of a valleys 61, the rotation speed of the dial knob 14 is decreased from that when the detent pins 30 moves on other portions in the detent surface 60. This decreases the speed of the detent pins 30 moving toward the valleys 61 in the detent surface 60. Thus, the striking noise generated when the detent pins 30 strike the vicinity of the bottoms 63 of the valleys 61 in the detent surface 60 is less annoying to the driver when the dial knob 14 returns to the predetermined operation position, for example, the parking position. Further, the controller 103 determines the period during which the detent pins 30 move from the vicinity of the peaks 64 of the ridges 62 on the detent surface 60 to the bottoms 63 of the adjacent valleys 61 based on the predetermined time t from when the rotation starts. Thus, the positions of the detent pins 30 relative to the detent surface 60 can be determined without a detector that detects rotation of the rotor cam 40.

The above embodiment may be modified as described below.

In the above embodiment, particular actions that satisfy the particular conditions (condition for executing automatic return action) are not limited to the actions described above. The particular actions may be other actions such as a combination of an action in which a seat belt of the driver seat is unfastened and an action in which the door of the driver seat is opened.

In the above embodiment, the shift lock mechanism 90 may restrict rotation of the dial knob 14 when the dial knob 14 is located at an operation position corresponding to the drive mode "D." For example, only when the foot brake is depressed, rotation of the dial knob 14 from the operation position corresponding to the drive range "D" is permitted.

In the above structure, when rotation of the dial knob 14 does not need to be restricted at the operation position of the dial knob 14, the shift lock mechanism 90 may be omitted.

In the above embodiment, the engagement portion 41 of the rotor cam 40 engages the cutout 53 in the knob body 50a so that the rotor cam 40 pushes and rotates integrally with the knob body 50a. However, the engagement of the rotor cam 40 and the knob body 50a is not limited to the engagement portion 41 and the cutout 53. The rotor cam 40 and the knob body 50a may be engaged by other structures.

In the above embodiment, when automatically returning the dial knob 14 from the operation position corresponding to the drive range "D" to the operation position corresponding to the parking mode "P," the drive voltage V is set to the first voltage V1 and the second voltage V2, which are constant. However, the drive voltage V does not have to be constant.

In the above embodiment, when automatically returning the dial knob 14 from the operation position corresponding to the drive range "D" to the operation position corresponding to the parking mode "P," the drive voltage V is set to the second voltage V2 from the peak 64 of a ridge 62 on the detent surface 60. However, when the noise generated by the detent pins 30 and the detent surface 60 is not a problem, the drive voltage V of the first motor 81 may be controlled to be, for example, constant when the detent surface 60 moves relative to the detent pins 30 after the rotor cam 40 engages the knob body 50a.

In the above embodiment, the parking mode "P" is set as the predetermined mode that undergoes automatic return. Instead, other gear modes may be set as predetermined ranges that undergo automatic return. For example, when the gear mode needs to be set to a neutral mode "N" to wash the vehicle, the driver performs a predetermined operation corresponding to washing of the vehicle so that the gear mode automatically returns to the neutral mode "N."

In the above embodiment, the rotation speed of the rotor cam 40 is gradually increased after the rotor cam 40 engages the dial knob 14. Instead, the rotation speed of the rotor cam 40 may be instantaneously increased after the rotor cam 40 engages the dial knob 14. For example, during the period until the rotor cam 40 engages the dial knob 14, the controller 103 may set the drive voltage V to be lower than when the rotor cam 40 is rotated at the other sections. Further, after the rotor cam 40 engages the dial knob 14, the controller 103 may set the drive voltage V to the first voltage V1.

Figure 13A:
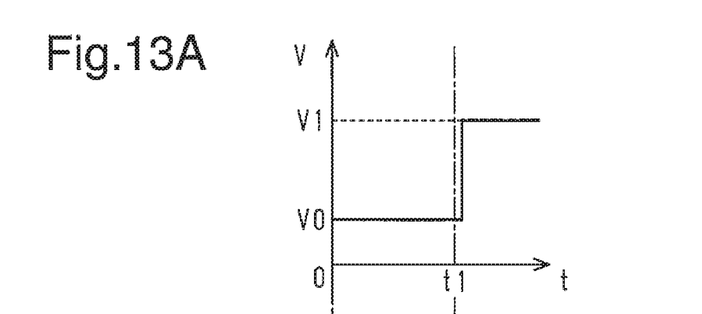
FIGS. 13A and 13B are graphs illustrating a modified example of control performed on the drive source by the shift device of FIG. 2.
Figure 13B:
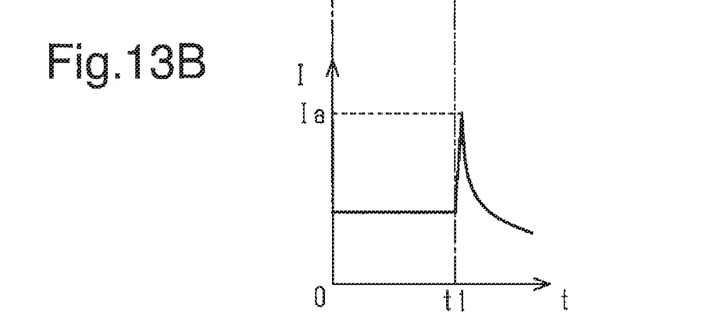

In the above embodiment, the predetermined time from when the rotation starts is used to determine that the rotor cam 40 has engaged the portion of the dial knob 14. However, the controller 103 may determine that the rotor cam 40 has engaged the portion of the dial knob 14 from when a current value of the first motor 81 becomes greater than or equal to a predetermined value. For example, as illustrated in FIG. 13A, during the rotation start time in which the dial knob 14 is automatically returned, the controller 103 minimizes the drive voltage V of the first motor 81 to a minimum voltage V0 and rotates the rotor cam 40 by driving the first motor 81. As illustrated in FIG. 13B, the controller 103 obtains a current value I of the first motor 81 and determines that the rotor cam 40 has engaged the knob body 50a when the current value I reaches a predetermined value Ia. When the rotor cam 40 engages the knob body 50a with the first motor 81 driven by the minimum voltage V0, the rotor cam 40 cannot rotate. As a result, the current value I dramatically rises. As illustrated in FIG. 13A, when the current value reaches the predetermined value Ia, the controller 103 changes the drive voltage to, for example, the first voltage V1 to drive the first motor 81 so that the rotor cam 40 rotates integrally with the knob body 50a. The drive voltage V until the rotor cam 40 engages the knob body 50a and the drive voltage V after the rotor cam 40 engages the knob body 50a may each be set to any value. Further, the drive voltage V does not have to be constant. This allows the controller 103 to determine that the rotor cam 40 has actually engaged the portion of the dial knob 14 from the engagement result without a detector that detects rotation of the rotor cam 40.

In the above embodiment, the dial knob 14 is cylindrical. However, the shape of the dial knob 14 (outer shape of knob cover 50b) may be changed. For example, the knob cover 50b may have the form of a polygonal pillar such as square pillar or pentagonal pillar. Alternatively, the knob cover 50b may be oval.

In the above embodiment, there are two combinations of the detent pins 30 and the detent 56. Instead, there may be only one combination of the detent pins 30 and the detent 56. Alternatively, there may be three combinations of the detent pins 30 and the detent 56.

In the above embodiment, the four operation positions corresponding to the gear modes "P," "R," "N," and "D" are set for the dial knob 14. However, the operation positions may be changed in accordance with the gear modes set for the transmission 107. In the same manner, the number and arrangement of the valleys 61 and the ridges 62 may be changed.

In the above structure, as long as the driver can understand the operation position, the detent mechanism including the detent 56, the detent pin 30, and the like may be omitted.

The invention claimed is:

1. A shift device comprising:
   a knob that is rotatable to select one of a plurality of gear modes of a transmission of a vehicle;
   a cam member that engages a portion of the knob in a rotation direction of the knob, wherein the cam member rotates integrally with the knob only when engaged with the portion of the knob;
   a drive source that rotates the cam member; and
   a controller that controls the drive source, wherein
   the controller controls the drive source to rotate the knob to an operation position corresponding to a predetermined gear mode if a particular condition is satisfied, and
   the controller decreases a voltage, which is applied to the drive source when the cam member is rotated in at least a pre-engagement section until the cam member engages the portion of the knob, from the voltage applied when the cam member is rotated in other sections.

2. The shift device according to claim 1, wherein during a period in which the cam member is rotated in a pre-post engagement section including the pre-engagement section and a predetermined section after the cam member engages the portion of the knob, the controller gradually increases the voltage applied to the drive source from when the cam member starts rotating and decreases the voltage from that when the cam member is rotated in other sections.

3. The shift device according to claim 1, wherein the controller determines that the cam member has engaged the portion of the knob based on a predetermined time from when the rotation starts.

4. The shift device according to claim 1, wherein the controller determines that the cam member has engaged the portion of the knob from when a current value of the drive source becomes greater than or equal to a predetermined value.

5. The shift device according to claim 1, wherein the knob includes
   a detent that holds the knob at an operation position corresponding to a gear mode selected from the plurality of gear modes, and
   a detent pin abut against the detent by a biasing force of a spring, wherein
   the detent includes a detent surface including a plurality of ridges and a plurality of valleys, wherein one of the ridges is alternately continuous with one of the valleys, and
   the detent is configured to hold the knob at the operation position corresponding to the selected gear mode by fitting the detent pin to one of the valleys and to produce click when the knob is rotated as the detent pin moves over the ridges.

6. The shift device according to claim 5, wherein
   after the cam member is rotated in the pre-engagement section and during a period in which the detent pin is moving from a peak of each of the ridges to a bottom of an adjacent one of the valleys on the detent surface, the controller decreases the voltage applied to the drive source from that when the detent pin moves from the bottom of each of the valleys to the peak of an adjacent one of the ridges on the detent surface, and
   the controller determines a period in which the detent pin moves from the peak of each of the ridges to the bottom of an adjacent one of the valleys on the detent surface based on a predetermined time from when the rotation starts.

* * * * *